United States Patent
Bala et al.

(10) Patent No.: US 8,619,074 B2
(45) Date of Patent: Dec. 31, 2013

(54) RENDERING PERSONALIZED TEXT ON CURVED IMAGE SURFACES

(75) Inventors: Raja Bala, Webster, NY (US); Zhigang Fan, Webster, NY (US); Reiner Eschbach, Webster, NY (US); Hengzhou Ding, West Lafayette, IN (US); Jan P. Allebach, West Lafayette, IN (US); Charles A. Bouman, West Lafayette, IN (US)

(73) Assignee: Xerox Corporation, Norwalk, CT (US)

( * ) Notice: Subject to any disclaimer, the term of this patent is extended or adjusted under 35 U.S.C. 154(b) by 511 days.

(21) Appl. No.: 12/964,820

(22) Filed: Dec. 10, 2010

(65) Prior Publication Data

US 2012/0146991 A1   Jun. 14, 2012

(51) Int. Cl.
*G06T 15/00* (2011.01)

(52) U.S. Cl.
USPC ............ 345/419; 345/421; 345/427; 345/441; 345/467; 345/582; 382/100; 382/104; 382/293; 382/295; 382/299

(58) Field of Classification Search
USPC .......... 345/419, 421, 427, 441, 467; 382/104, 382/154, 295
See application file for complete search history.

(56) References Cited

U.S. PATENT DOCUMENTS

| | | | | |
|---|---|---|---|---|
| 5,918,398 | A  * | 7/1999 | Stanley et al. | 40/594 |
| 6,201,881 | B1 * | 3/2001 | Masuda et al. | 382/100 |
| 8,012,019 | B2 * | 9/2011 | Escalera et al. | 463/32 |
| 8,121,338 | B2 * | 2/2012 | Clermont et al. | 382/100 |
| 8,244,070 | B2 * | 8/2012 | Chapman et al. | 382/293 |
| 2005/0226538 | A1* | 10/2005 | Di Federico et al. | 382/299 |
| 2010/0156919 | A1* | 6/2010 | Bala et al. | 345/582 |
| 2010/0302594 | A1 | 12/2010 | Chapman et al. | |
| 2010/0329513 | A1* | 12/2010 | Klefenz | 382/104 |

* cited by examiner

*Primary Examiner* — Kimbinh T Nguyen
(74) *Attorney, Agent, or Firm* — Fay Sharpe LLP

(57) ABSTRACT

As set forth herein, a computer-implemented method facilitates replacing text on cylindrical or curved surfaces in images. For instance, the user is first asked to perform a multi-click selection of a polygon to bound the text. A triangulation scheme is carried out to identify the pixels. Segmentation and erasing algorithms are then applied. The ellipses are estimated accurately through constrained least squares fitting. A 3D framework for rendering the text, including the central projection pinhole camera model and specification of the cylindrical object, is generated. These parameters are jointly estimated from the fitted ellipses as well as the two vertical edges of the cylinder. The personalized text is wrapped around the cylinder and subsequently rendered.

17 Claims, 10 Drawing Sheets

RENDERING PERSONALIZED TEXT ON CURVED IMAGE SURFACES

TECHNICAL FIELD

The present exemplary embodiments broadly relate to the insertion of variable text into images. They find particular application with the estimation of image object geometry to provide appropriate text placement therein. However, it is to be appreciated that the present exemplary embodiments are also amenable to other like applications.

BACKGROUND

Today, there is great interest in the personalization and customization of images as a way to add value to documents. This is especially true in transactional and promotional markets, but is gaining traction in more image intensive markets such as photo finishing. In many such applications, a photo-realistic result is intended, since the targeted products, e.g. calendars, include high quality photographic content. Several technologies currently exist to personalize images such as XMPie, DirectSmile, and AlphaPictures, for example.

Many of these solutions are cumbersome and complicated, requiring stock photos, sophisticated design tools, and designer input with image processing experience.

One of the main challenges in incorporating text into an image is to estimate the 3D geometric properties of the surface on which the text is to be rendered. Several of the existing tools handle the problem by presenting via a GUI a 2D text grid that can be overlaid on the image and locally warped in 2-dimensions to appear to fit onto the 3D object surface. This is however a cumbersome and time-consuming exercise, especially for complex curved surfaces Furthermore, since the grid is specified in 2-dimensions, the text cannot be moved to another location on the same surface without re-manipulating the 2D grid.

There is an unmet need in the art for convenient and easy-to-use systems and methods that facilitate inserting personalized text into an image comprising non-planar surfaces in a natural and less restrictive manner.

BRIEF DESCRIPTION

In one aspect, a computer-implemented method for placing personalized text onto a curved surface in an image comprises receiving user input pertaining to a location of an existing text string in the image, defining a bounding polygon according to user input, segmenting the existing text string, and performing connected component analysis on the text string to identify connected components in the existing text string. The method further comprises detecting at least one of upper and lower extreme edge pixels of text characters represented by the connected components, identifying an edge at each side of the curved surface, and calculating 3D curved surface geometry and camera geometry using the upper and lower extreme edge pixels of the text characters and left and right edges. Additionally, the method comprises erasing the existing text string by replacing text pixels with background-colored pixels, and inserting a personalized text string into the location of the erased text according to the calculated 3D curved surface geometry and camera geometry.

In another aspect, a system that facilitates replacing an existing text string on a curved surface in an image with a personalized text string comprises a computer-readable medium that stores computer-executable instructions, and a processor that executes the computer-executable instructions, the instructions comprising receiving user input pertaining to a location of an existing text string in the image, defining bounding polygon according to user input, and segmenting the existing text string. The instructions further comprise performing connected component analysis on the text string to identify connected components in the existing text string, detecting upper and lower extreme edge pixels of text characters represented by the connected components, and identifying an edge at each side of the curved surface. The instructions further include calculating 3D curved surface geometry and camera geometry using the upper and lower extreme edge pixels of the text characters and identified edges, erasing the existing text string by replacing text pixels with background-colored pixels, and inserting a personalized text string into the location of the erased text according to the calculated 3D curved surface geometry and camera geometry.

In yet another aspect, a computer-implemented method for placing personalized text onto a curved surface in an image comprises bounding a region on a curved surface in the image, segmenting an existing text string in the bounded region, and detecting upper and lower extreme edge pixels of text characters represented by connected components in the bounded region. The method further comprises identifying an edge at each side of the curved surface, calculating 3D curved surface geometry and camera geometry, replacing existing text pixels in the bounded region with background-colored pixels, and inserting a personalized text string that is generally different from the erased text into the bounded region according to the calculated 3D curved surface geometry and camera geometry.

DETAILED DESCRIPTION

The systems and methods described herein can be utilized to incorporate personalized text onto curved surfaces such as cylinders. U.S. patent application Ser. No. 12/340,103 entitled SYSTEMS AND METHODS FOR TEXT-BASED PERSONALIZATION OF IMAGES relates to text-based personalization of planar surfaces in images, and is hereby incorporated by reference herein in its entirety. The present specification extends the concept of text-based personalization to cylindrical surfaces such as coffee mugs, bottles, etc., in an image. Specifically, the herein-described systems and methods facilitate replacing existing text in an image with personalized text. Since the described systems and methods estimate the true underlying 3D geometry of the curved surface (e.g., a cylinder), the rendered text can be "moved around" within the cylindrical surface, and its appearance in image coordinates will adapt to conform to the true surface geometry, i.e.: text size and orientation automatically adjusts itself to the image location. This aspect is distinct from existing solutions, which use a 2D transform that does not adapt with spatial location.

Figure 1:
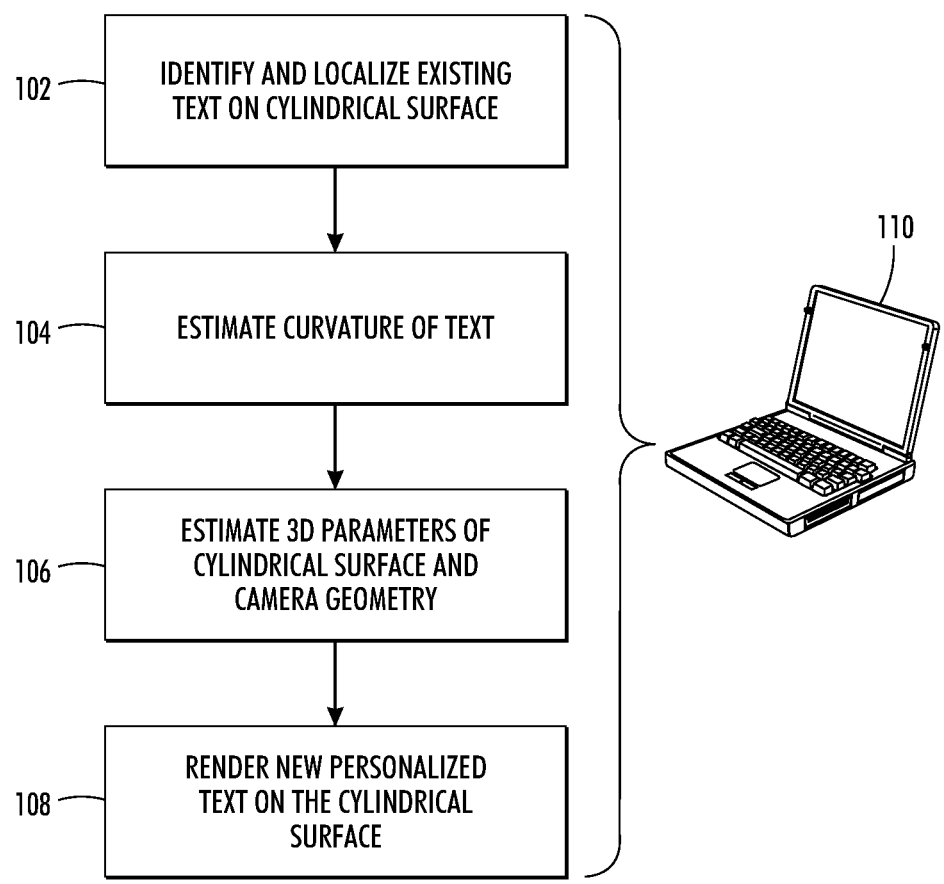
FIG. 1 illustrates a method for incorporating a personalized text string onto a curved or cylindrical surface in an image based at least in part upon 3D geometry related thereto.

FIG. 1 illustrates a methodology 100 (e.g., a text personalization algorithm or the like) to incorporate a personalized text string onto a curved or cylindrical surface in an image based at least in part upon 3D geometry related thereto. At 102, localization of existing text on a cylindrical surface is performed. At 104, the curvature of the text is estimated. At 106, the camera geometry and 3D surface parameters are estimated. At 108, personalized text is rendered onto the cylindrical surface. The method can be implemented using a computer 110.

Figure 2:
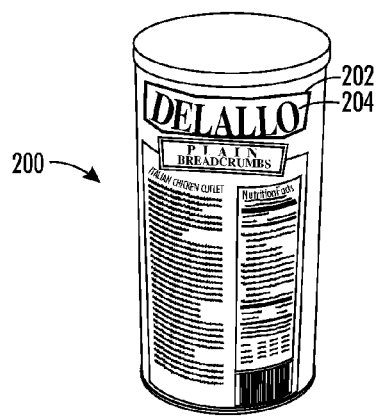
FIG. 2 shows a digital image in which a user has defined a text region bounding box or polygon that encloses or encompasses text (e.g., letters, numbers, etc.) on a curved surface by defining a plurality of points around the text.
Figure 3:
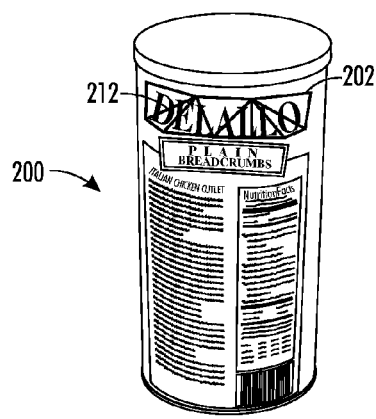
FIG. 3 shows the digital image after a triangulation algorithm has been executed (e.g., by a processor) to identify pixels in the bounding box.

Localization of the existing text in step 102 involves specifying a bounding shape such as a polygon that encloses the text. The location and shape of the bounding box can be determined either completely automatically, completely manually, or via a combination of manual input from the user and automatic analysis of the image. In one embodiment, a user clicks on a set of points to enclose the text, as shown in FIG. 2. A bounding algorithm connects the points with straight lines to form a polygon. In another embodiment, a text identification algorithm is used to automatically identify the location and region of existing text in the image. An example of such a text identification technique is the Xerox PageCam (www.pagecam.com). To identify the region that is interior to the bounding box or polygon, the herein-described methods may employ a triangulation scheme called ear clipping, as shown in FIG. 3. The identified pixels are marked red in FIG. 4. Within this region, a segmentation algorithm is used to separate text from background pixels, and connected components of edge pixels are derived for each character within the text string, as is described in U.S. patent application Ser. No. 12/340,103.

Figure 5:
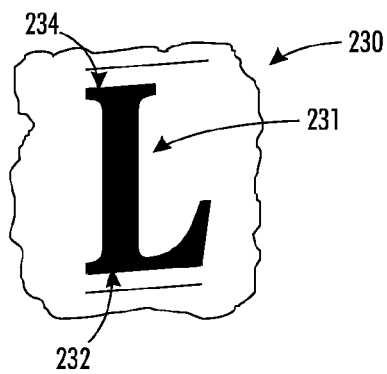
FIG. 5 illustrates an image of a letter of text, upon which a projection algorithm has been executed on connected components (e.g., letters, numbers, symbols, other text, etc.), where the connected components have been generated or detected using a connected component algorithm or technique.
Figure 6:
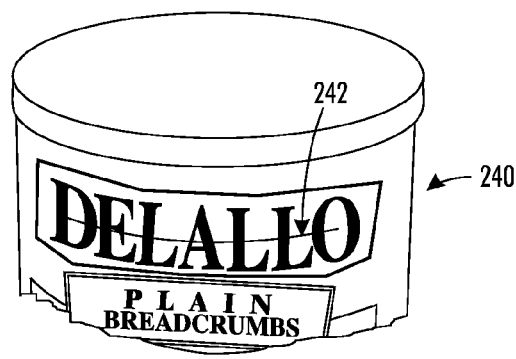
FIG. 6 shows an image in which a quadratic curve has been identified through the centers of the bounding boxes of all connected components, which corresponds to the text characters.

In a related example, at 104, the curvature of the text on the curved surface is estimated. In this step, the topmost and bottommost edge pixels for each text character are identified from the aforementioned connected component analysis. More specifically, a projection based algorithm is carried out for each connected component. The projection algorithm searches for the directions that line up with the topmost and bottommost pixels, respectively. A connected component of a text character with the identified lineup directions is shown in FIG. 5. The directions are found by nudging or adjusting an initial estimate obtained from the tangential line of a quadratic curve using the centers of the bounding boxes of all connected components, as shown in FIG. 6. This example deals with upper case letters, which have the same height for both topmost and bottommost pixels. For text with lower case letters, preprocessing is performed before applying the ellipse fitting algorithm. See FIG. 7 for identified topmost (red) and bottommost (blue) pixels.

The pixel locations are supplied to an ellipse-fitting algorithm. The reason for using an elliptical form is that when projecting a 3D cylinder onto the 2D camera plane, the circular cross-section projects onto an ellipse. It will be appreciated, however, that theoretically the cross-section may be a conic section. The general equation of the ellipse is as follows:

$$f(x, y) = ax^2 + bxy + cy^2 + ex + dy + f = 0 \text{ subject to } b^2 - 4ac < 0.$$

Thus the parameters [a, b, c, d, e, f] uniquely specify an ellipse.

For all data points $(x_i, y_i)$ that are topmost edge pixels, the sum of the squares of the algebraic distance is optimized as follows:

$$[a, b, c, d, e, f] = \operatorname{argmin} \sum_i f(x_i, y_i)^2.$$

The process is repeated for bottommost edge pixels.

Figure 8:
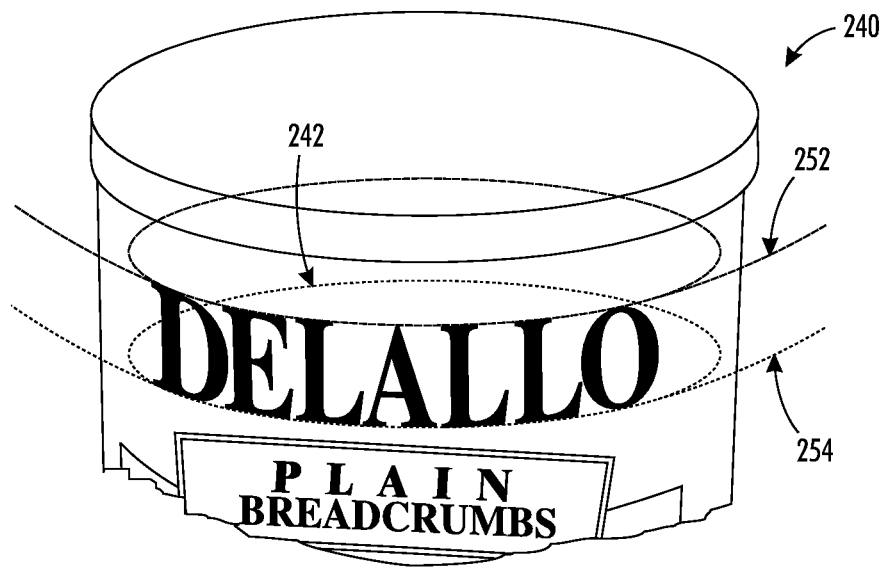
FIG. 8 shows the image, on which one incorrectly sized ellipse and one quadratic curve have been generated for both the topmost and the bottommost edge pixels.

However, due to the insufficient data and the nature of the algebraic distance as commonly defined in the literature on computer vision, the size of the ellipse may be incorrectly estimated. If a new cost function approximating geometric distance is applied, the problem may exhibit a shallow minimum (namely ellipses with very different sizes can arguably fit the same data quite well). This is because the data is insufficient in the sense that all data points are restricted on an arc of the ellipse with limited angle. In extreme cases, a quadratic curve would also fit the data well. FIG. 8 shows examples of both an incorrectly estimated ellipse (which does not match up with the left and right cylinder edges) and a quadratic curve, both of which appear to fit the text edges rather well.

Figure 9:
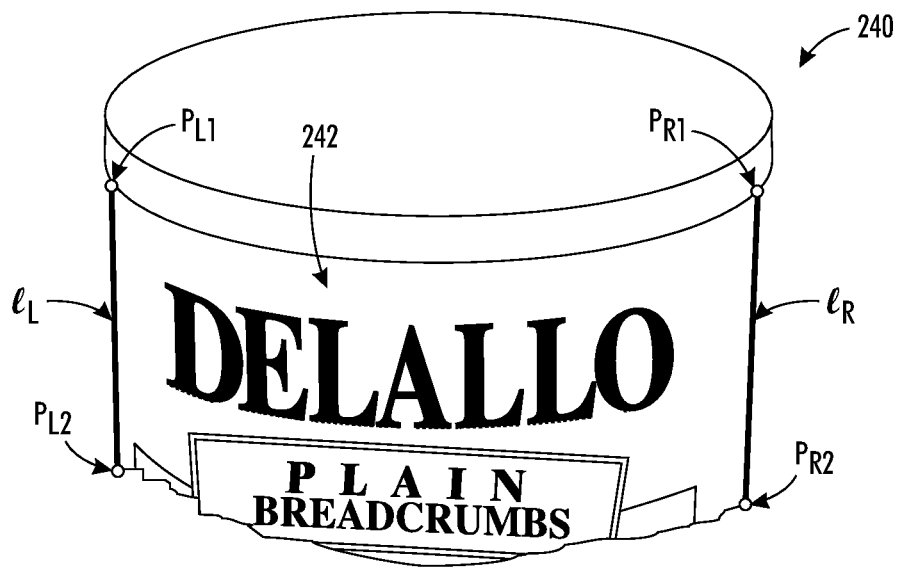
FIG. 9 shows the image with cylinder edges or lines $l_L$ and $l_R$ positioned respectively on the left and right or vertical edges of the curved surface on which the personalized text is to be positioned.

In order to resolve this issue and derive an accurate estimate of the true elliptical curve on which the text lies, the ellipse fitting algorithm receives additional cues, which are the left and right edges of the cylinder. These edges may be obtained completely manually, completely automatically or via some combination of automatic analysis and manual user input. In the preferred embodiment, the cylinder edges are identified by the user via a graphical user interface. An example is shown in FIG. 9. Specification of the cylinder edges poses a constraint on the length and direction of the major axis of the ellipse. Let the length of the major axis of the ellipse be m. By rotating and shifting the coordinates, the new equation for the ellipse is obtained as below:

$$f(x,y)=a(x^2-(m/2)^2)+(y-b)^2=0 \text{ subject to } a>0.$$

Figure 10:
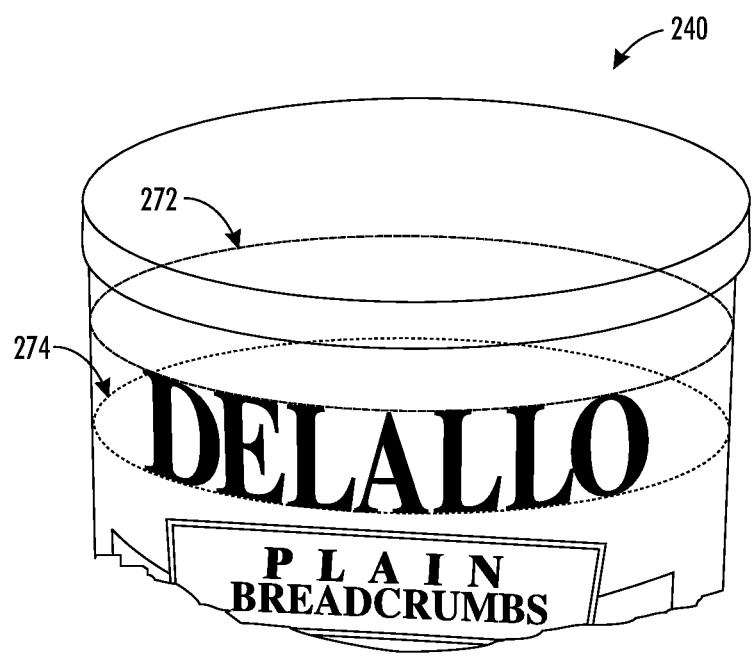
FIG. 10 shows the image with a fitted top ellipse and a fitted bottom ellipse, each of which is tangential to the top and bottom tangential quadratic curve lines, respectively.

Still minimizing the sum of the squares of the algebraic distance, the parameters of the ellipse with correct size are obtained. Two ellipses are now correctly estimated, one for the top edges and one for the bottom edges, as shown in FIG. 10.

Figure 11:
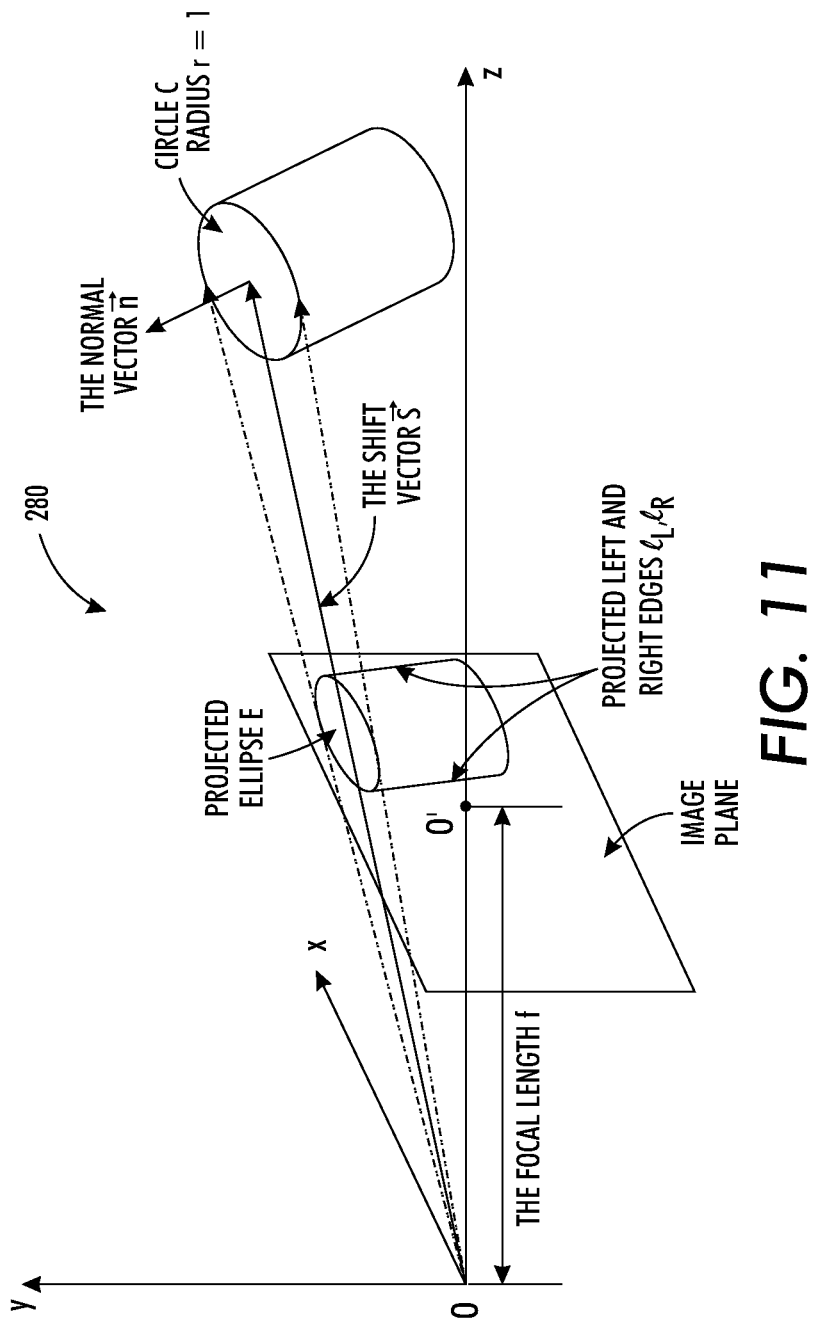
FIG. 11 illustrates a 3D central projection pinhole camera model.

Still referring to FIG. 1, at 106, the 3D curvature and camera geometry are estimated. To render the text, a 3D central projection pinhole camera model is adopted, as shown in FIG. 11. To calibrate the camera, its focal length f is estimated. In addition, the geometry of a cylinder in 3D is derived. The orientation of the cylinder is specified by a normal vector $\vec{n}$. A specific cross section of the cylinder is taken, which is a circle, and the vector originating from the origin of the camera model O and pointing to the center of that cross section is defined as the shift vector $\vec{s}$. Redundancy exists between the shift vector and the radius of the circle, in the sense that the same projected shape can be created by simultaneously increasing the radius of the cylinder and shifting it farther away from O. Consequently, the radius of the circle is fixed at 1. Hence, the parameters to be estimated are the focal length f, the normal vector $\vec{n}$, and the shift vector $\vec{s}$.

As described with regard to step 104, two ellipses (potentially more) have been fitted from the topmost and bottommost edge pixels of the segmented text. At step 106, one ellipse is placed into the model, and it is assumed that the shift vector defined previously corresponds to this ellipse. Generalization to the situation of two ellipses is straightforward. Step 106 is described in greater detail with regard to FIGS. 11 and 12.

Figure 14:
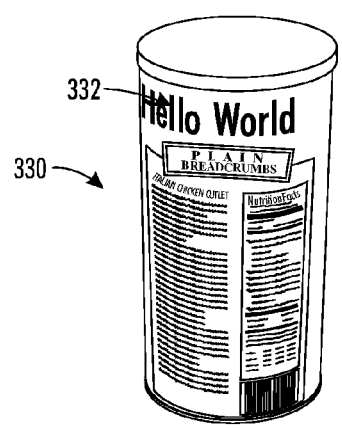
FIG. 14 shows an image in which personalized text has been inserted on the curved surface.
Figure 15:
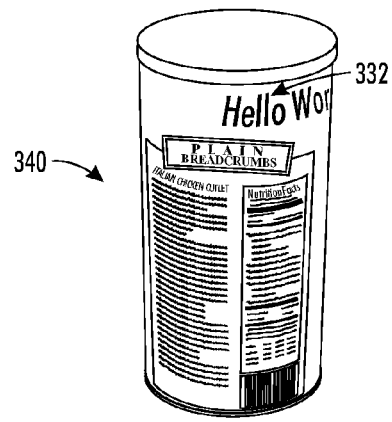
FIG. 15 shows an image in which the personalized text has been rotated circumferentially about the cylindrically curved surface.

At 108, the personalized text is rendered on the cylindrical surface using the 3D camera model with derived parameters f, $\vec{n}$, and $\vec{s}$. In one embodiment, the rendering is implemented in Java3D. For instance, a cylinder with a unit circle cross section is constructed, with its estimated parameters, the normal vector $\vec{n}$, and the shift vector $\vec{s}$. The camera is calibrated with the estimated focal length f. The text is rendered onto a virtual cylinder, and subsequently projected onto the image for rendering. The virtual cylinder is shown in gray in FIG. 13, while two different renderings of the text are shown in FIGS. 14 and 15. An appealing part in the proposed approach is that the text can be moved and even wrapped around the cylindrical surface.

Though the described method relates to text replacement, the generalization to text insertion is also contemplated. Furthermore global cues besides the original text, such as edges and elliptical contours of the object, may be exploited.

Figure 4:
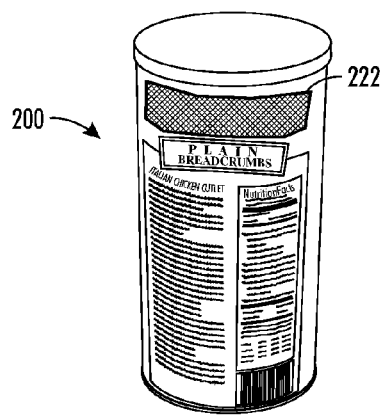
FIG. 4 shows the image after pixels in the bounding box have been marked in red.

FIGS. 2-4 illustrate various stages of the localization of existing text as performed in step 102. FIG. 2 shows a digital image 200 in which a user has defined a text region bounding box or polygon 202 that encloses or encompasses text 204 (e.g., letters, numbers, etc.) on a curved surface (e.g., a cylindrical can or container in this example) by defining a plurality of points around the text 204. For instance, the user can click (e.g., with a mouse or stylus, or a finger on a touch screen) various points around the text 204, which are then connected to form the bounding box 202.

FIG. 3 shows the digital image 200 after a triangulation algorithm has been executed (e.g., by a processor), such as an "ear-clipping" algorithm or technique, to identify pixels in the bounding box.

FIG. 4 shows the image 200 after pixels in the bounding box 202 have been marked in red. A segmentation algorithm is executed on the bounding box to distinguish text pixels from background pixels.

FIGS. 5-10 illustrate various stages of text personalization that occur during text curvature estimation, as performed in step 104 (FIG. 1). FIG. 5 illustrates an image 230 of a letter of text 231, upon which a projection algorithm has been executed on connected components (e.g., letters, numbers, symbols, etc.), where the connected components have been generated or detected using a connected component algorithm or technique. The projection algorithm has identified a lower boundary line 232 through the bottom-most pixels on the text letter 231, and an upper boundary line 234 through top-most pixels on the text letter 231.

FIG. 6 shows an image 240 in which a quadratic curve 242 is fitted through centers of the bounding box. The tangential lines computed from the curve serve as initial estimates of the projection direction in the projection based algorithm that is used to identify the upper and lower boundaries 234, 232 (FIG. 5).

Figure 7:
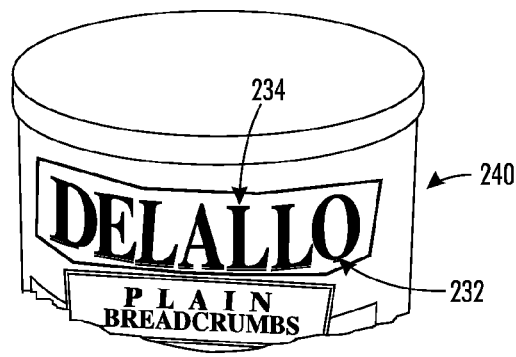
FIG. 7 shows the image, with lower boundaries and upper boundaries shown on all letters in the bounding box region.

FIG. 7 shows the image 240, with lower boundaries 232 and upper boundaries 234 shown on all letters in the bounding box region (not shown in FIG. 7).

FIG. 8 shows the image 240, on which an incorrectly estimated upper ellipse 256 and an incorrectly estimated lower ellipse 258 are drawn. The two ellipses are computed using the upper and lower boundaries 234, 232. A top quadratic curve 252 and a bottom quadratic curve 254 have also been generated. The figure shows that the upper and lower boundaries alone are not enough to correctly estimate the ellipses.

FIG. 9 shows the image 240 with cylinder edges or lines $l_L$ and $l_R$ positioned respectively on the left and right or vertical edges of the curved surface on which the personalized text is to be positioned. The edges are then used by the ellipse-fitting algorithm to estimate the correctly sized top and bottom ellipses. In one embodiment, a user defines endpoints $P_{L1}$ and $P_{L2}$ for the left edge line, and $P_{R1}$ and $P_{R2}$ for the right edge line. In another embodiment, the endpoints and corresponding lines are determined automatically.

FIG. 10 shows the image 240 with a correctly fitted top ellipse 272 and a correctly fitted bottom ellipse 274, each of which is tangential to the top and bottom text boundaries (FIG. 8), respectively. The fitted ellipses have been calculated taking into account the left and right edges $l_L$ and $l_R$, and thus correctly extend outward to the edges of the cylindrical or curved package surface.

Figure 12:
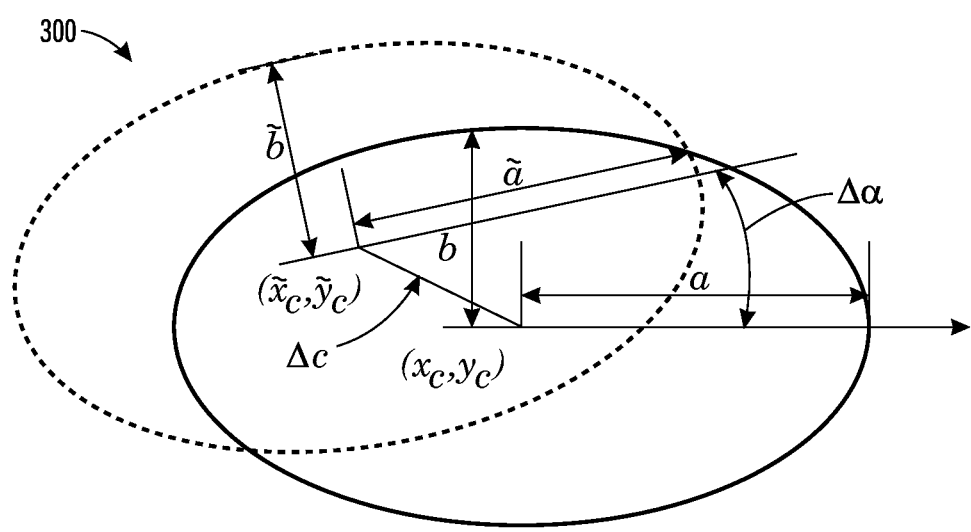
FIG. 12 illustrates a model for comparing two ellipses.
Figure 16:
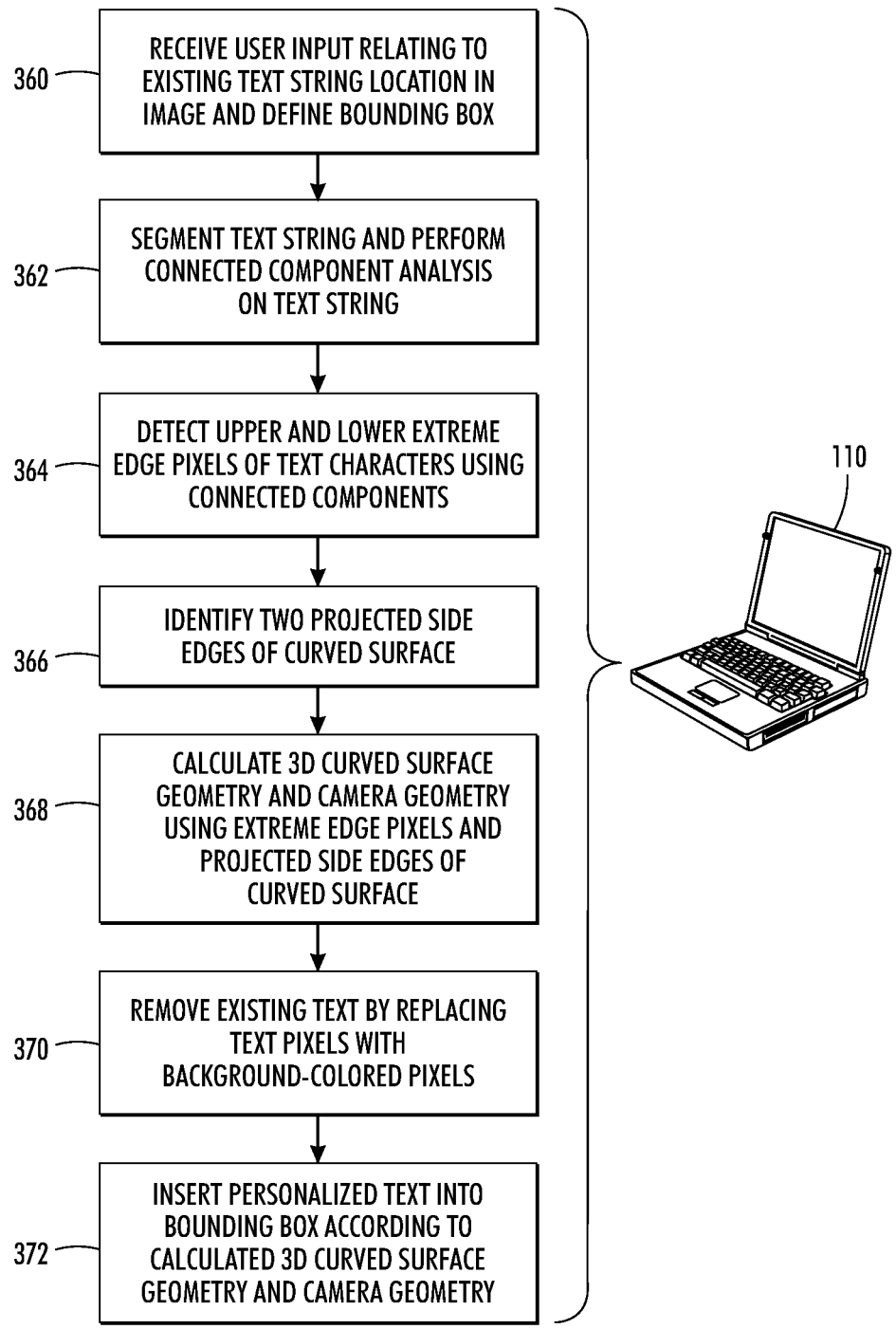
FIG. 16 illustrates a computer-executable method for replacing an existing text string with personalized text on a cylindrical object or other curved surface in a digital or electronic image, in accordance with various aspects described herein.
Figure 17:
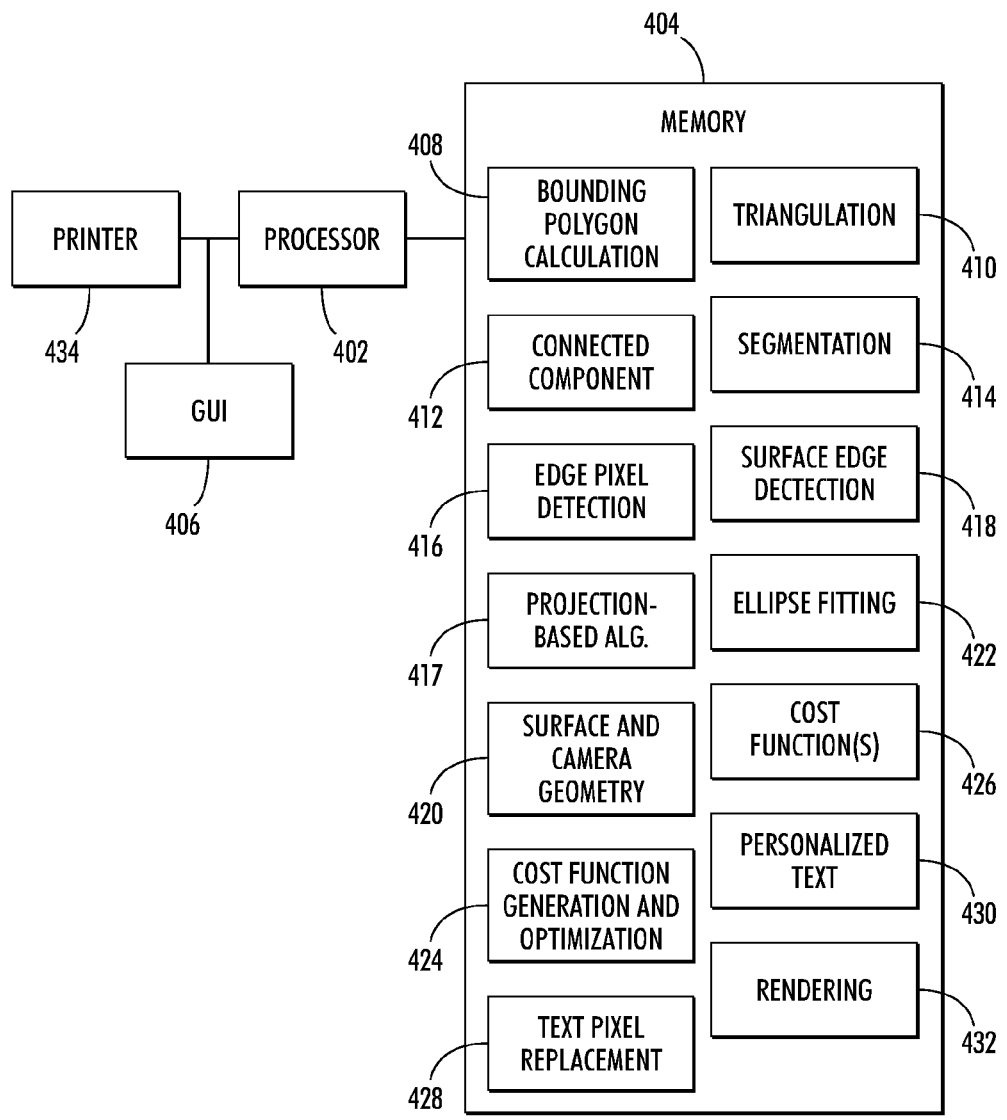
FIG. 17 illustrates a system for inserting personalized text onto a curved surface in an electronic image, in accordance with one or more aspects described herein.

FIGS. 11 and 12 relate to estimating the 3D geometry of the curved surface and the camera geometry, as set forth in step 106 (FIG. 1) and step 368 (FIG. 16), and may be utilized or executed, e.g., by a processor such as the processor 402 of FIG. 17. To render the text, a 3D central projection pinhole camera model 280 is used, as shown in FIG. 11. The model 280 includes an image plane positioned at a point O' that is a predetermined distance (a focal length) f from a point of origin O. The projected ellipse is denoted by E, and the projected left and right edges by $l_L$, $l_R$, in the image plane. The forward camera model M that projects the 3D object and camera geometry onto 2D features on the image plane is summarized by:

$$[E, l_L, l_R]=M(f, \vec{n}, \vec{s}).$$

Note that the projected output of the forward model E, $l_L$, $l_R$ can be derived analytically from its input f, $\vec{n}$, $\vec{s}$. To distinguish from the output of the forward model, all parameters computed from actual image data will be denoted with tildes, and will be denoted herein as "measured" parameters. Specifically, let the measured ellipse(s) of FIG. 10 computed from image pixels be denoted by $\tilde{E}$, and the end points of the two edges marked out by the user be denoted by $\tilde{P}_{L1}$, $\tilde{P}_{L2}$, $\tilde{P}_{R1}$, $\tilde{P}_{R2}$ (FIG. 9). Now it can be seen that the objective is to estimate a set of parameters $\hat{f}$, $\hat{\vec{n}}$, $\hat{\vec{s}}$, such that the output of the forward model, i.e. the projected features E, $l_L$, $l_R$, will match as closely as possible to the measured quantities $\tilde{E}$, $\tilde{P}_{L1}$, $\tilde{P}_{L2}$, $\tilde{P}_{R1}$, $\tilde{P}_{R2}$.

One way to estimate the parameters is to define a cost function that measures how well the model projection matches the measured image data. In one embodiment, the cost function comprises a sum of two components: $C=C_1+C_2$. The first component $C_1$ measures the difference between the projected and measured ellipses $\tilde{E}$ and E. Thus $C_1$ describes a degree to which the projected ellipse obtained from the model M matches a measured ellipse computed from extreme edge pixels of text characters in the image. Specifically, the distance between the center points $\Delta c$, difference between the lengths of semi-major and semi-minor axes $\Delta a = a - \tilde{a}$ and $\Delta b = b - \tilde{b}$, and the angle between the two semi-major axes $\Delta \alpha$ are computed, as illustrated in FIG. 12. These differences are then combined as follows:

$$C_1(\tilde{E}, E) = \Delta a^2 + \Delta b^2 + \Delta c^2 + \Delta \alpha^2.$$

The second component $C_2$ describes a degree to which the projected left and right edges $l_L$ and $l_R$ obtained from the model M match the left and right edges identified within the image. In the case where the measured edges are obtained from user input, this is accomplished by computing the distances between the four end points marked out by the user, $\tilde{P}_{L1}$, $\tilde{P}_{L2}$, $\tilde{P}_{R1}$, $\tilde{P}_{R2}$, and the corresponding lines, $l_L$, $l_R$, which are predicted by the forward model M. The second part of the cost function $C_2$ is summarized as:

$$C_2(\tilde{P}_{L1}, \tilde{P}_{L2}, \tilde{P}_{R1}, \tilde{P}_{R2}, l_L, l_R) = d_l(\tilde{P}_{L1}, l_L)^2 + d_l(\tilde{P}_{L2}, l_L)^2 + d_l(\tilde{P}_{R2}, l_R)^2,$$

where $d_l(\tilde{P}, l)$ denotes the shortest distance from the point $\tilde{P}$ to the line l.

Finally, the cost function C is given by $C=C_1+C_2$. According to an example, a Quasi-Newton numerical method is employed with a Broyden-Fletcher-Goldfarb-Shanno (BFGS) update to the Hessian matrix for optimizing the cost function with respect to the 3D geometry parameters f, $\vec{n}$, $\vec{s}$. In particular, the gradient of the cost function is also evaluated numerically. Multiple solutions can be found representing ambiguous situations. For example, there are two cylinder orientations that can give rise to the same projected ellipse on the image plane. One unique solution is selected, utilizing knowledge of the curvature of the existing text on the cylinder.

There is a second variant to compute the cost function $C_1$. Instead of explicitly fitting ellipses from topmost and bottommost pixels, these pixels can be treated as detected data and brought into the cost function. Consequently, a different cost function $C'_1$ can be defined as:

$$C'_1(\{\tilde{Q}_i\}, E) = \frac{1}{N} \sum_{i=1}^{N} d_E(\tilde{Q}_i, E)^2,$$

where $\{\tilde{Q}_i\}$ denotes the collection of text edge pixels lying on the same ellipse, i.e., either the group of topmost pixels, or the group of bottommost pixels, E is the projected ellipse predicted by model M, N is the number of pixels, and $d_E(Q, E)$ denotes the distance from the pixel Q to the ellipse. In particular, this approach uses only the topmost pixels and effectively only one ellipse (at a time). An extension to more than one ellipse is straightforward, as will be understood by those of skill.

Replacing $C_1$ with $C'_1$ in the cost function C and utilizing the same optimization technique on the new cost function, similar solutions can be obtained, and one unique solution that conforms to the known real-world geometry can be selected. The advantage of the new cost function is that the step of ellipse fitting described above is not required; instead optimizing the new cost function implicitly fits an ellipse to the topmost/bottommost pixels.

Figure 13:
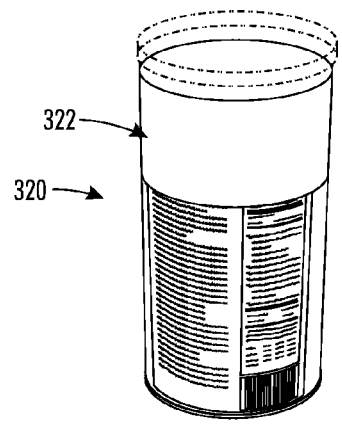
FIG. 13 illustrates an image in which an output ellipse or cylinder has been generated, onto which the personalized text is overlaid.

FIG. 13 illustrates an image 320 in which a virtual cylinder 322, shown in gray, has been generated, onto which the personalized text is to be overlaid.

FIG. 14 shows an image 330 in which personalized text 332 has been inserted on the curved surface.

FIG. 15 shows an image 340 in which the personalized text 332 has been rotated circumferentially about the cylindrically curved surface.

FIG. 16 illustrates a computer-executable method for replacing an existing text string with personalized text on a cylindrical object or other curved surface in a digital or electronic image, in accordance with various aspects described herein. The method may be executed, for instance, on the computer 110. At 360, user input is received regarding an existing text string to be removed and in place of which personalized text is to be inserted. For instance, the user input may include a plurality of points clicked on, selected, or otherwise identified by the user using an input tool (e.g., a mouse, stylus, finger, keyboard, etc.), where the selected points define a bounding box (as described with regard to FIGS. 1 and 2) around the existing text. Alternatively, the user defines the bounding box on a curved surface in the image that contains no text (i.e., the personalized text is inserted in a blank region rather than to replace existing text).

At 362, the existing text string is segmented (e.g., using a segmentation algorithm or the like, as described with regard to FIGS. 1 and 3), and a connected component algorithm is executed thereon to identify text characters (e.g., letters, numbers, symbols, etc.). At 364, upper and lower extreme edge pixels in the text characters are identified using the connected components, as described with regard to FIGS. 1 and 5. At 366, the left and right edges of the curved surface or cylinder are identified or determined, as described with regard to FIGS. 1 and 9. At 368, the 3D curved surface (e.g., cylindrical surface) geometry and camera geometry are calculated, as described with regard to FIGS. 1, 6-8, and 10-13. At 370, existing text pixels are replaced by pixels of a background color in the bounding box, in order to create a blank slate for personalized text insertion. At 372, personalized text is inserted into the bounding box according to the 3D curved surface geometry and the camera geometry calculated at 368. Input of the personalized text can be facilitated via substantially any known data entry means such as a GUI processing component, or retrieval from a database of personalized text records, and can include characters in any language. It is understood that a personalized text string might include simple symbols such as stars, smileys, icons, etc., commonly referred to as "wingdings."

It is to be appreciated that text replacement as described herein may optionally employ a plurality of other steps. A first is erasure of the original text wherein a simple distance weighted interpolation technique can be employed to replace text pixels with a local estimate of the background. In addition, properties of the new variable text can be determined beyond a geometry property to include a color, a size, a font, a shading, a blur, etc. In this manner, the new text rendering is enabled to be consistent with the previously existing text and/or the rest of the scene. In one embodiment, color is estimated from an average of classified text pixels while the size of the new text is determined by a selected region of original text from an image. In a further embodiment, automatic estimation can be performed via an artificial intelligence component (not shown) for rendering of variable text as described herein.

For texture modulation, one approach is to use a large collection of real world images to derive sets of resolution-independent basis functions to describe real world textures under a range of illumination conditions and viewpoints. In the second step, texture regions in any arbitrary image can be identified and fit to some combination of these basis functions. The results of such a fit might be used for inference of the illumination conditions or viewpoint. In the rendering step, the basis weights can be modulated in real time, thus imposing a modulation on the texture in a natural way to create a readable text message on the image.

In addition to modulating the basis weights, texture information can be utilized to infer 3-D geometric information such as perspective and foreshortening within the image. Any application, applet or engine (such as JAVA) can be utilized for the creation, modulation and insertion of variable text into an image.

In one approach, the first step is skipped to incorporate the personalized text by modulating a chosen image property (e.g. contrast or luminance) at some fixed predetermined location in the image (e.g. top center) independent of image content. The advantage is that the image analysis required in step one is eliminated. Another variant is pattern modulation, wherein a region of an image is identified that contains repeating patterns. Examples include brick or tiles walls, or walkways, windows in office buildings, chain link fences, etc. A message is then imposed into this pattern by modifying the pattern. Examples might include eliminating or adding mortar joints in a brick wall or changing color and/or likeness.

A computer 110 can be employed as one possible hardware configuration to support the systems and methods described herein. It is to be appreciated that although a standalone architecture is illustrated, that any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiment.

The computer 110 can include a processing unit (not shown), a system memory (not shown), and a system bus (not shown) that couples various system components including the system memory to the processing unit. The processing unit can be any of various commercially available processors. Dual microprocessors and other multi-processor architectures also can be used as the processing unit.

The computer 110 typically includes at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above can also be included within the scope of computer readable media.

A user may enter commands and information into the computer through a keyboard (not shown), a pointing device (not shown), such as a mouse, voice input, or graphic tablets. The computer 110 can operate in a networked environment using logical and/or physical connections to one or more remote computers, such as a remote computer(s). The logical connections depicted include a local area network (LAN) and a wide area network (WAN). Such networking environments are commonplace in offices, enterprise-wide computer networks, intranets and the Internet.

FIG. 17 illustrates a system 400 for inserting personalized text onto a curved surface in an electronic image, in accordance with one or more aspects described herein. The system 400 includes a processor 402 that executes, and a memory 404 (e.g., a computer readable medium) that stores, computer-executable instructions (i.e., algorithms or the like) for performing the various functions, methods, techniques, etc., described herein. The system 406 further includes a graphical user interface 406 (e.g., a computer or the like) into which a user inputs information and on which the electronic image is presented or displayed to the user. The memory stores a bounding algorithm 408 (i.e., computer-executable instructions) that defines a bounding polygon around existing text on the curved surface in the image. In one embodiment, the user selects, via the GUI, at least three points around the existing text on the curved surface, and the bounding algorithm connects the points to form the bounding polygon.

The memory additionally stores a triangulation algorithm 410, such as an ear-clipping algorithm or the like, that identifies pixels in the bounding polygon. A connected component algorithm 412 is executed by the processor to identify connected components in the bounding polygon. A segmentation algorithm 414 is executed to separate background pixels from foreground pixels (e.g., text). An edge pixel detection algorithm 416 detects all edge pixels and identifies all connected components. A projection-based algorithm 417 is executed for each connected component which projects all edge pixels of the connected component to a directional line to find the topmost and bottommost pixels. A surface edge detection algorithm 418 detects the lateral edges or sides of the curved surface in the image. In one embodiment, this information is input by the user.

The processor 402 additionally executes instructions 420 for calculating the surface and camera geometry, which includes generating a model M as described with regard to FIG. 11. An ellipse fitting algorithm 422 is executed to fit a modeled ellipse to the curved surface, the ellipse being used as a guide to align new text on the curved surface. A cost-function generation algorithm 424 is executed to generate one or more cost functions 426 (or components thereof. The cost function 426 describes how well the modeled ellipse(s)

approximate the curved surface in the image. A text pixel replacement algorithm 428 is executed to replace text pixels with pixels matching the background color in the bounding polygon. Personalized text 430, which may be input by the user via the GUI 406, is then inserted into the bounding polygon. A rendering algorithm 432 is executed to present the image with the inserted personalized text to the user on the GUI. The system 400 may also include a printer 434 that prints the image with personalized text.

The exemplary embodiments have been described with reference to the preferred embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A computer-implemented method for placing personalized text onto a curved surface in an image, comprising:
    receiving user input pertaining to a location of an existing text string in the image;
    defining a bounding polygon according to user input;
    segmenting the existing text string;
    performing connected component analysis on the text string to identify connected components in the existing text string;
    detecting at least one of upper and lower extreme edge pixels of text characters represented by the connected components;
    identifying an edge at each side of the curved surface;
    via a processor, calculating 3D curved surface geometry and camera geometry using the upper and lower extreme edge pixels of the text characters and left and right edges, wherein calculating the 3D curved surface geometry and camera geometry comprises generating a 3D central projection pinhole camera model defined as:

$$[E, l_L, l_R] = M(f, \vec{n}, \vec{s})$$

where E is a projected ellipse, $l_L$ is a left edge of the cylinder, $l_R$ is a right edge of the cylinder, M is the model that maps a 3D object to its 2D projection on an image plane, f is a focal length from a point of origin to an image plane, $\vec{n}$ is a normal vector, and $\vec{s}$ is a shift vector;
    erasing the existing text string by replacing text pixels with background-colored pixels; and
    inserting a personalized text string into the location of the erased text according to the calculated 3D curved surface geometry and camera geometry to personalize the image, and outputting the personalized image.

2. The method according to claim 1, wherein the user input comprises a plurality of points on the image selected by the user using a graphical user interface (GUI), and further comprising defining the bounding polygon as a function of the user-selected points.

3. The method according to claim 1, further comprising segmenting the existing text string according to pixel color.

4. The method according to claim 1, wherein the curved surface is cylindrical and the upper and lower extreme edge pixels of the text characters fall on an ellipse within the image.

5. The method according to claim 1, further comprising:
    building a cost function of the 3D geometry parameters f, $\vec{n}$, $\vec{s}$ that describes a degree to which the projected ellipse and left and right cylinder edges match the measured ellipse and left and right cylinder images obtained from image data; and
    calculating 3D geometry parameters f, $\vec{n}$, $\vec{s}$ that minimize the said cost function.

6. The method according to claim 5 wherein the cost function C comprises a first component $C_1$ that describes a degree to which the projected ellipse obtained from the model M matches a measured ellipse computed from extreme edge pixels of text characters in the image, and a second component $C_2$ that describes a degree to which the projected left and right edges $l_L$ and $l_R$ obtained from the model M match the left and right edges identified within the image.

7. The method of claim 6 wherein the first component $C_1$ is determined as a function of:
    a distance between center points of the projected ellipse and the measured ellipse;
    a difference between the lengths of semi-minor axes of the projected ellipse and the measured ellipse;
    a difference between the lengths of semi-major axes of the projected ellipse and the measured ellipse; and
    an angle between the semi major axes of the projected ellipse and the measured ellipse.

8. The method according to claim 7 wherein the first component $C_1$ is computed as a function of distances from the detected extreme edge pixels of text characters to the projected ellipse E.

9. The method according to claim 6, wherein the second component $C_2$ is determined as a function of distances between endpoints of projected and identified edge lines bounding the edges of the cylinder.

10. A system that facilitates replacing an existing text string on a curved surface in an image with a personalized text string, comprising:
    a non-transitory computer-readable medium that stores computer-executable instructions;
    a processor that executes the computer-executable instructions, the instructions comprising:
    receiving user input pertaining to a location of an existing text string in the image;
    defining a bounding polygon according to user input;
    segmenting the existing text string;
    performing connected component analysis on the text string to identify connected components in the existing text string;
    detecting upper and lower extreme edge pixels of text characters represented by the connected components;
    identifying an edge at each side of the curved surface;
    calculating 3D curved surface geometry and camera geometry using the upper and lower extreme edge pixels of the text characters and identified edges, wherein calculating 3D curved surface geometry and camera geometry comprises generating a 3D central projection pinhole camera model defined as:

$$[E, l_L, l_R] = M(f, \vec{n}, \vec{s})$$

where E is a projected ellipse, $l_L$ is a left edge of the curved surface, $l_R$ is a right edge of the curved surface, M is the model, f is a focal length from a point of origin to an image plane, $\vec{n}$ is a normal vector, and $\vec{s}$ is a shift vector;
    erasing the existing text string by replacing text pixels with background-colored pixels; and
    inserting a personalized text string into the location of the erased text according to the calculated 3D curved surface geometry and camera geometry.

11. The system according to claim 10, wherein the user input comprises a plurality of points on the image selected by the user using a graphical user interface (GUI), and the instructions further comprising defining the bounding polygon as a function of the user-selected points.

12. The system according to claim 10, the instructions further comprising segmenting the existing text string according to at least one of pixel color and pixel luminescence.

13. The system according to claim 10, wherein the curved surface is cylindrical.

14. The system according to claim 10, the instructions further comprising building a cost function that describes a degree to which an output ellipse matches a measured ellipse in the image.

15. The system according to claim 14, wherein:
the cost function C comprises a first component $C_1$ and a second component $C_2$;
wherein the first component is determined as a function of:
a distance between center points of the output ellipse and the measured ellipse;
a difference between the lengths of semi-minor axes of the output ellipse and the measured ellipse;
a difference between the lengths of semi-major axes of the output ellipse and the measured ellipse; and
an angle between the semi major axes of the output ellipse and the measured ellipse; and
wherein the second component is determined as a function of distances between endpoints of edge lines bounding the edges of the curved surface.

16. A computer-implemented method for placing personalized text onto a curved surface in an image, comprising:
bounding a region on a curved surface in the image;
segmenting an existing text string in the bounded region;
detecting upper and lower extreme edge pixels of text characters represented by connected components in the bounded region;
identifying an edge at each side of the curved surface;
via a processor, calculating 3D curved surface geometry and camera geometry by generating a 3D central projection pinhole camera model defined as:

$$[E, l_L, l_R] = M(f, \vec{n}, \vec{s})$$

where E is a projected ellipse, $l_L$ is a left edge of the curved surface, $l_R$ is a right edge of the curved surface, M is the model, f is a focal length from a point of origin to an image plane, $\vec{n}$ is a normal vector, and $\vec{s}$ is a shift vector;
replacing existing text pixels in the bounded region with background-colored pixels; and
inserting a personalized text string into the bounded region according to the calculated 3D curved surface geometry and camera geometry to personalize the image, and outputting the personalized image.

17. The method according to claim 16, wherein the curved surface is cylindrical.

* * * * *